UNITED STATES PATENT OFFICE.

RAYMOND M. GLACKEN, OF BALTIMORE, MARYLAND.

CANNING ACID FRUITS OR VEGETABLES

1,021,770.  Specification of Letters Patent.  Patented Apr. 2, 1912.

No Drawing.  Application filed June 9, 1911.  Serial No. 632,287.

*To all whom it may concern:*

Be it known that I, RAYMOND M. GLACKEN, a citizen of the United States, residing at Baltimore, State of Maryland, have invented new and useful Improvements in Canning Acid Fruits or Vegetables, of which the following is a specification.

My invention relates, primarily, to means for reducing the acidity of canned fruits and vegetables whereby to lessen the danger of the injurious effect of acid upon tin or other metallic substances, affected by acid, used in the manufacture of the cans or packages in which the fruit or vegetables are incased. The reduction of this fruit acid is of vital importance to the tin can industry, and also to the healthfulness of processed goods, that is to say, it is of vital importance to render this acid harmless, or to prevent entirely the formation of salts of tin or to reduce their presence to such an extent as to be negligible.

If an examination be made of fruit or vegetables processed in the usual manner, and a comparison be made of them with the same fruit or vegetables treated by my process, it will be observed that under the latter in every instance the acidity is reduced while in most cases the flavor has been largely improved.

Ordinary fruits and some vegetables, when packed in plain cans, inasmuch as and to the extent that they contain acids or acid salts, commence at once to form salts of tin which are poisonous in their nature, and one object of my invention, as stated, is to prevent, or in a large measure reduce, this action. Ordinarily the acids will attack the tin, and especially will do so when pin holes occur in the plate, voltaic or galvanic action being at once set up with bad results. Moreover, many fruits and vegetables are packed in an over ripe condition and hence contain free acetic acid, and therefore these fruits and vegetables will attack the tin in an unusually active manner. It is also well known that the flavor or aroma of distilled liquors and also of undistilled wines results largely from acetic acid or other organic acids which combine with the alcohols present or formed in the liquors, and in this way good results are obtained. In most cases the combinations are with the ethyl group, but the flavor of whisky depends largely upon the amyl group. This process is known to the trade as the aging process, and warehouses and bonded stores are required to carry it into effect, one important result of the aging process being the reduction of the acidity of alcoholic liquors which is effected by time, oxidation and combination.

My process, as applied to fruits or vegetables, will accomplish what requires a much longer time in any other way.

Many canned fruits are packed simply in water, as for example, apples and peaches for pie making. They are sold cheaply, and hence no sugar is used.

The reaction occurring between alcohol or ether and fruit acid, as in the case of peaches, for instance, is quite simple, it being merely the formation of the normal acetic ether, which is the usual flavoring agent of this fruit. But where the fruit acid is more complex, the reaction becomes more complicated, through proceeding always along well known lines and being similar to the simple reaction above mentioned. Furthermore, it is known that fruit acids form the basis of or for the production of sugar. The sour and bitter taste of unripe grapes and apples yields to the sweet taste and aromatic odor of the ripe fruit. Now while this change is taking place something more is happening than the simple change of fruit acids into sugar, namely, the taste and odor are being developed by the production, in many cases, of a volatile fruit ether or flavor. When the fruit acid and the alcohol combine to form the flavor and taste of the fruit, known as the fruit ether, this is done at the expense of the fruit acid which has been neutralized in order to form the fruit ether which is a combination of the fruit acid with the small amount of alcohol formed in the perfectly ripe fruit; and what nature effects under the mild action of sunlight and gentle heat I propose, as a second feature of my invention, to reproduce, for there is no reason why the same reactions should not take place when stimulated by the high heat incident to the processing assisted by pressure.

My method consists in adding to the fruit or vegetables, before sealing up, ethyl alcohol whereby a reduction in the acidity of fruit or vegetables is effected. In other respects my method does not differ from the ordinary mode of processing fruit or vegetables. The ethyl alcohol is used, proportionately to the contents of the can, in very small quantities—say one tenth to five tenths per cent. this being added before or after the canning but necessarily before the processing. The action produced is in effect a neutralization of the fruit acids whereby the formation of salts of tin under the attack of acids in the cans is prevented. Furthermore, the neutralization of the fruit acids, in the processing or preserving act, results in an improved flavor due to the formation of fruit ethers. Therefore, a two-fold advantage is derived from my invention, first, that of protection from the injurious effect upon human health of salts of tin or other similar noxious substances; and, secondly, an improvement in the flavor of the fruit or vegetables which is in effect but a restoration to a natural condition of excellence. The amount of ethyl alcohol needed for any batch of ripe or unripe fruit may be easily ascertained by chemical means, or by the taste, after a little experience.

It is well known that acetic acid is easily liberated from its combinations; hence I propose to add a small amount of acetate of soda to such fruit or vegetables as do not contain an acid which readily forms a combination with ethyl alcohol. Acetate of soda is an organic salt and perfectly harmless even though used in large quantities. This change in the fruit or vegetables will then be the formation of acetic ether and a combination of the fruit or vegetable acid with the base of acetate of soda. In this way the destructive acid salts are neutralized. The acetate of soda when used is added in proportions of from $\frac{1}{10}$ to $\frac{5}{10}$ per cent. As an equivalent of acetate of soda, acetate of potash, acetate of ammonia, or acetate of calcium or lime may be used.

Referring to peaches which have been made ready for canning in any ordinary manner, I add to the syrup or liquid to be put in the cans with the peaches, either ethyl alcohol, or a mixture of the same with the syrup in sufficient quantity as will represent, say for ripe fruit $\frac{1}{10}$ per cent., and for green fruit $\frac{4}{10}$ per cent. The cans are then closed and processed in the usual manner.

Fruit treated by my process will gain in flavor and lose in acidity. While the change in flavor is not so noticeable in fruits other than peaches, one of the important features of my invention is to prevent corrosion of the cans. The ethyl alcohol is used in the cans to neutralize the fruit acids and to provide something on which said acids can act. The fruit acid which causes the greatest trouble by producing corrosion or eating of the tin, and the consequent formation of tin salts, is oxalic acid. This acid is present in rhubarb and blueberries, and also in tomatoes; and while not always present in the acid form as free acid or acid oxidation, is present in a loosely combined form which when combined with tin, is known, to have a deleterious effect on the consumer. Oxalic acid being stronger than acetic acid, will expel the latter from the acetate of soda, which is a harmless salt; even when used in great amounts; while the acetic acid will be neutralized by the ethyl alcohol present to form the fruit ether.

I am aware that many other alcohols and ethers, and allied organic compounds, have the power to combine with fruit acids. For example, glycerin, which is a triatomic alcohol, will, as is well known, combine with acetic acid to form what is familiar to the trade as acetin. I am also aware that it is generally claimed and admited that ethyl acetate is dissociated at high temperatures, but this will not prevent its being reformed, as canned goods after being heated must be allowed to cool, and hence there is abundant opportunity for the fruit ethers to re-form even if temporarily decomposed.

Having thus described my invention, I claim:—

1. The within described improvement in the industry of canning fruits and vegetables in tin, consisting in the reduction of their acidity by subjecting them to ethyl alcohol in the presence of heat and pressure.

2. The within described improvement in the industry of canning fruits and vegetables in tin, consisting in the reduction or lessening of their acidity by the addition of ethyl alcohol prior to the canning, whereby is effected a reduction or neutralization of the acids and the consequent prevention of the formation of salts of tin by contact of the acids with the tin cans.

3. The within described improvement in the industry of canning fruits and vegetables in tin, consisting in the reduction of their acidity by the addition of ethyl alcohol and subsequent processing whereby is effected a reduction or neutralization of the acids and the consequent prevention of the formation of the salts of tin by contact of the acids with the tin cans.

4. The within described improvement in the industry of canning fruits and vegetables in tin, consisting in the reduction of their acidity by subjecting them to ethyl alcohol and acetate of soda in the presence of heat and pressure.

5. The within described improvement in the industry of canning fruits and vegetables in tin, consisting in the reduction or lessening of their acidity by the addition of ethyl alcohol and acetate of soda prior to the canning and processing, whereby is effected a reduction or neutralization of the acids and the consequent prevention of the formation of salts of tin by contact of the acids with the tin cans.

6. The within described improvement in the industry of canning fruits and vegetables in tin, consisting in the reduction of their acidity by the addition of ethyl alcohol and acetate of soda and subsequent processing whereby is effected a reduction or neutralization of the acids and the consequent prevention of the formation of the salts of tin by contact of the acids with the tin cans.

In testimony whereof I affix my signature in presence of two witnesses.

RAYMOND M. GLACKEN.

Witnesses:
P. W. JAMES,
WHITNEY W. JONES.